UNITED STATES PATENT OFFICE.

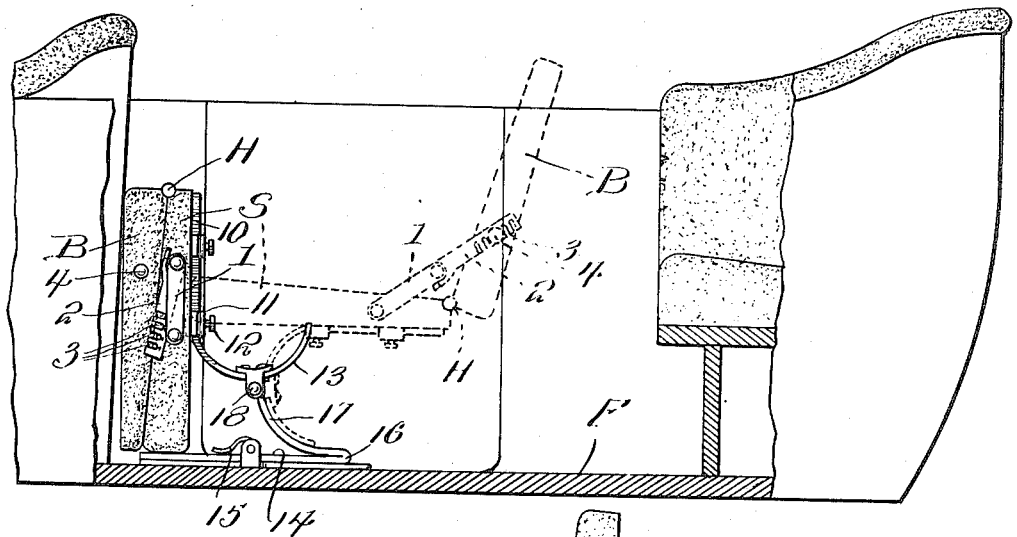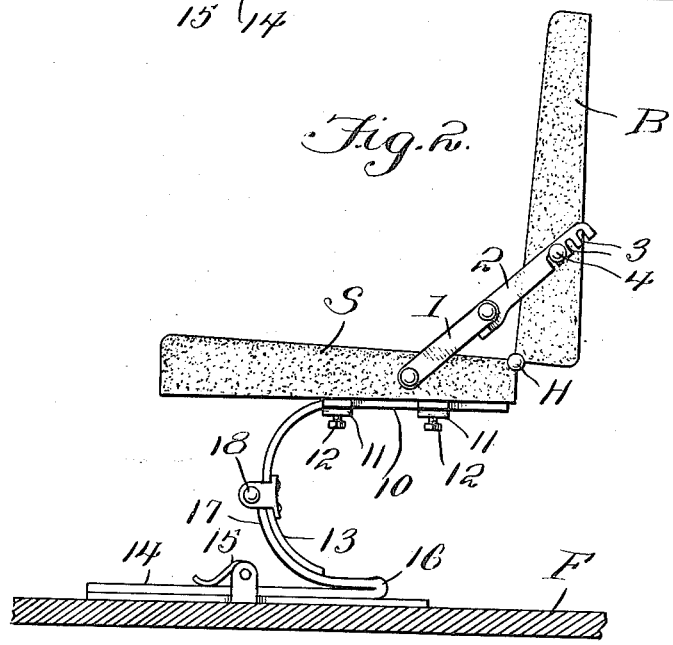

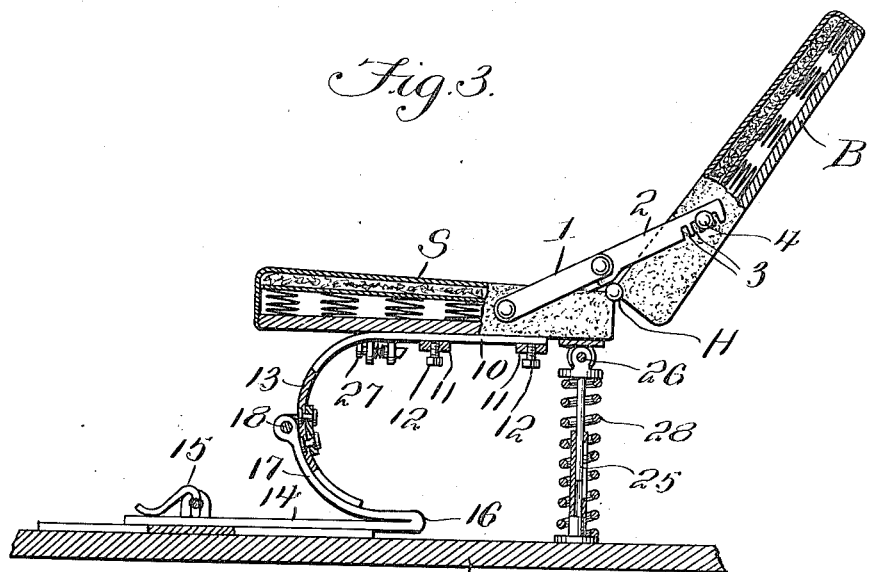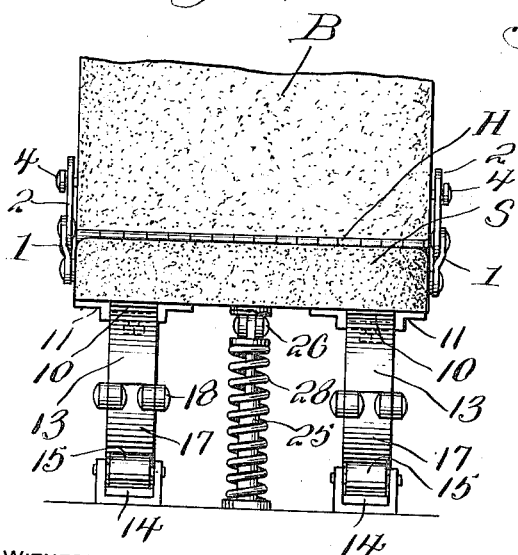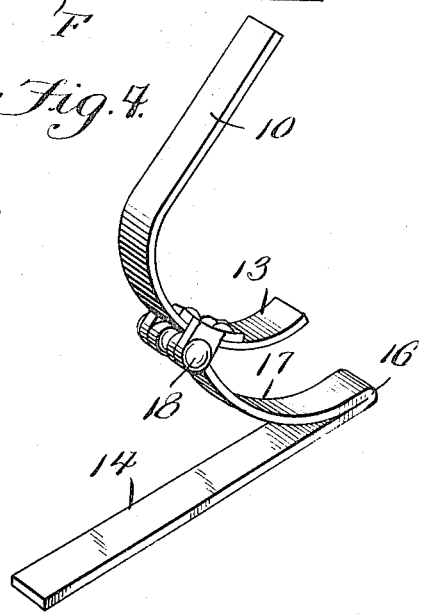

GEORGE C. JACKMAN, OF SPOKANE, WASHINGTON.

VEHICLE-SEAT.

1,261,396.  Specification of Letters Patent.  Patented Apr. 2, 1918.

Application filed April 10, 1917. Serial No. 161,028.

*To all whom it may concern:*

Be it known that I, GEORGE C. JACKMAN, a citizen of the United States, residing at Spokane, in the county of Spokane and State of Washington, have invented new and useful Improvements in Vehicle-Seats, of which the following is a specification.

This invention relates to vehicle seats, and more especially to the supporting springs therefor; and the object of the same is to produce an improved seat and spring of this character for use in automobiles or other vehicles where the seat must fold out of the way when it is not in use but where adjustment of its supporting spring is highly advantageous when the seat is in use.

To an extent the invention is an improvement on my former application for Patent #133,342, filed November 25, 1916, and to which reference is made.

The invention consists primarily in the construction of the spring, and secondarily in its adjustment over the floor of the vehicle and beneath the body of the seat; and the invention also consists in certain details which will be explained in the following specification and claims, reference being had to the drawings wherein:—

Figure 1 is a sectional view through the body of an automobile, showing this improved seat disposed in the tonneau thereof and folded forward out of the way against the back of the front seat.

Fig. 2 is an enlarged side elevation of this seat opened out and ready for use.

Fig. 3 is a sectional view of this seat ready for use, the leg and snub spring being added and the back being here adjusted to a greater inclination than shown in the other views.

Fig. 4 is a perspective detail of one of the springs entire, partly opened on its hinge and illustrating also the adjustments for its upper and lower legs.

Fig. 5 is a front elevation of the seat in operative position, with parts broken away.

In the drawings, the letter F is used to designate the floor of the vehicle, which latter in the present instance is an automobile having a tonneau wherein it is desired to mount this seat in rear of the fixed front seat of the automobile and forward of the fixed rear seat thereof, S is the seat proper and B the back which is connected with the rear edge of the seat by hinges H. These seat elements may be cushioned or upholstered in any suitable manner, and the hinge must be such that the back may be folded down onto the seat when the entire device is not in use. For holding the back at adjustable angles to the seat, links 1 are connected with the frame of the seat and carry at their upper rear ends pivotal links 2 having notches 3, and pins 4 in the side bars of the frame of the back are adapted to be engaged with these notches as shown. However, any other suitable means may be provided for adjusting the angle of the back, or the latter might be connected with the seat bottom by knuckle-hinges, so that it could open upward only to about a vertical but could fold forward over the seat bottom when the device is out of use. Care should be exercised that the axis of the hinge H is so disposed that, if the faces of the seat bottom and back are upholstered, these faces will come close together when the back is folded down.

In a detail description of the invention, wherein like numerals refer to like parts throughout the several views, a U-shaped spring is employed opening rearwardly and standing beneath each side of the seat-bottom frame, or in other words there are two of these springs in the complete structure. Each spring is in two members, the upper member having a rather long straight leg 10 underlying the seat and slidably mounted through guides 11 wherein it is held by set screws 12, and bending downward at its front end in a curved leaf 13; and the lower member having a long flat leg 14 overlying the floor F and passing under a clip 15 thereon, and this leg bent sharply at its rear end in an angle 16 and carried thence upward in a leaf 17 which normally overlies the leaf 13. These two leaves form part of the bend of the U constituting the spring, and the upper end of the lower leaf is hinged at 18 to the body of the upper leaf so that the entire upper member and with it the seat structure can be rocked over to a folded position as seen in Fig. 1. When thrown back to an operative position, the lower end of the leaf 13 rests within the bend of the leaf 17 and the two spring leaves overlie each other to give the entire spring considerable strength just at this point. The adjustment beneath the clips 15 is to permit the setting of the seat structure with reference to the fixed front seat of the vehicle, and the adjustment within the guide 11 is to permit the setting of the seat bottom on the upper member of the spring so as to secure a greater or less amount of resiliency to the seat itself, according as the weight and the size of the rider may demand.

The use of this device is obvious. When not used the back is folded down onto the bottom and the entire seat structure turned over the hinges 18 so that it passes down onto the floor F in rear of the front fixed seat, and then possibly the lower legs 14 may be moved forward through the clips 15 and the latter tightened to hold the device thus stored and out of the way. For very heavy passengers, or where the vehicle is to travel over a rough road or has exceedingly active springs, it may be desirable to use a leg for preventing the excessive descent of the seat bottom under the weight of the passenger. This leg is indicated in the drawings by the numeral 25 and it is hinged at its upper end at 26 beneath the frame of the seat bottom near the rear edge of the latter, the free end of the leg being engaged by a button 27 or otherwise when this leg is folded against the seat bottom and thrown out of use. As shown in the drawing I prefer to make this leg telescopic and to place a spring 28 on said leg with its ends resting against the enlarged ends thereof. It might be said that this seat is not limited to use on automobiles, as obviously it could be employed in other types of vehicles, or on any support which would take the place of the floor lettered F herein; but the device finds its greatest use in places where it needs to be folded out of the way when not occupied.

What is claimed as new is:—

1. The herein described seat spring formed in two members whereof the upper comprises a flat leg and a curved leaf extending from one end of the same and adapted for attachment beneath a seat, and the lower member comprises a curved leaf lapping the first named leaf and a leg at its lower end and adapted for attachment to a base, and a hinge connection between the upper end of the lower leaf and the upper leaf at a point between its extremity and its leg, for the purpose set forth.

2. The herein described seat spring formed in two members whereof the upper comprises a flat leg and a bent leaf extending from one end of the same, the leg adapted for attachment beneath a seat, and the lower member comprises a bent leaf lapping the first named leaf and a leg standing at an angle to its lower end and adapted to be secured to a base, and a hinge connection between the upper end of the lower leaf and the upper leaf at a point between its extremity and its leg, for the purpose set forth.

3. In a vehicle seat, the combination with the seat proper, guides beneath it, and clips on the floor of the vehicle; of a seat-support comprising an upper member adjustable in said guides and bent downward at its forward end, a lower member adjustable in said clip and bent upward at a point forward of the down-bent end of the upper member, the lower end of the latter lapping and conforming with the bend of the upper end of the lower member, and a hinge connection between the upper extremity of the lower member and the body of the upper member for the purpose set forth.

4. In a vehicle seat, the combination with the seat proper, and a supporting spring of U-shape comprising two members, the upper member being secured beneath the seat and having a leaf extending through the bend of the U, and the lower member secured to the floor of the vehicle and having a leaf extending partway through the bend of the U, and a hinge connection between the upper end of the lower leaf and the body of the upper leaf; of a spring support for the rear of the said frame.

In testimony whereof I affix my signature.

GEORGE C. JACKMAN.